United States Patent [19]

Hunt, III et al.

[11] Patent Number: 4,982,790

[45] Date of Patent: Jan. 8, 1991

[54] METHOD TO REDUCE MOVEMENT OF A CPF DEVICE VIA A GELLED PETROLEUM BASED FLUID

[75] Inventors: William C. Hunt, III, Farmers Branch; Craig H. Phelps, Carrollton, both of Tex.

[73] Assignee: Mobil Oil Corporation, Fairfax, Va.

[21] Appl. No.: 459,119

[22] Filed: Dec. 29, 1989

[51] Int. Cl.$^5$ .......................................... E21B 43/263
[52] U.S. Cl. .................................... 166/299; 166/300; 166/308
[58] Field of Search ................. 166/63, 177, 299, 300, 166/308; 299/13; 252/8.551

[56] References Cited

U.S. PATENT DOCUMENTS

| Re. 23,733 | 11/1953 | Farris | 166/308 UX |
|---|---|---|---|
| 2,664,165 | 12/1953 | Bond | 166/308 |
| 2,708,876 | 5/1955 | Nowak | 166/299 |
| 2,766,828 | 10/1956 | Rachford, Jr. | 166/299 |
| 2,906,338 | 9/1959 | Shook | |
| 2,978,024 | 4/1961 | Davis | |
| 3,064,730 | 11/1962 | Malone et al. | 166/278 |
| 3,498,380 | 3/1970 | Sparlin et al. | 166/278 |
| 4,039,030 | 8/1977 | Godfrey et al. | 166/299 |
| 4,751,966 | 6/1988 | Jones | 166/299 |

*Primary Examiner*—George A. Suchfield
*Attorney, Agent, or Firm*—Alexander J. McKillop; Charles J. Speciale; Charles A. Malone

[57] ABSTRACT

A method for minimizing damage to downhole equipment utilized during controlled pulse fracturing ("CPF") where an oil based thickened fluid is used as a tamp. A gelled oil based fluid overlies a CPF propellant device thereby creating a tamp. When the propellant contained in the device is ignited, this high viscosity gelled fluid prevents the remnant of said device and wireline from moving upwardly which minimizes damage thereto.

17 Claims, 1 Drawing Sheet

METHOD TO REDUCE MOVEMENT OF A CPF DEVICE VIA A GELLED PETROLEUM BASED FLUID

FIELD OF THE INVENTION

This invention is directed to a method for minimizing damage to downhole equipment which is utilized during controlled pulse or high energy fracturing ("CPF"). More specifically, it is directed to the use of a viscous gelled oil based tamp which minimizes movement of said equipment.

BACKGROUND OF THE INVENTION

Stimulation of wells through mechanical fracturing can be accomplished by a method known as controlled pulse fracturing or high energy gas fracturing. A good description of this method appears in an article by Cuderman, J. F., entitled "High Energy Gas Fracturing Development," Sandia National Laboratories, SAND 83-2137, October 1983. Using this method enables multiple fracturing of a formation or reservoir in a radial manner which increases the possibility of contacting a natural fracture. In the practice of this method, a housing means for containing a propellant is suspended into a wellbore. This housing means is placed downhole next to an oil or hydrocarbonaceous fluid productive interval.

Presently, it is now a common practice to use diesel oil or lease crude as a fluid tamp in a reservoir where contacting the formation with a water-based fluid will cause an undesired loss of permeability. However, neither tamp controls the movement of the wireline and remaining device upon deflagration of the propellant because of the tamp's low viscosity.

The propellant in the housing means or molded body can belong to the modified nitrocellulose or the modified and unmodified nitroamine propellant class. Suitable solid propellants capable of being utilized include a double-based propellant known as M-5. It contains nitroglycerine and nitrocellulose. Another suitable propellant is a composite propellant which contains ammonium perchlorate in a rubberized binder. The composite propellant is known as HXP-100 and is purchasable from the Holex Corporation of Hollister, Calif. M-5 and HXP-100 propellants are disclosed in U.S. Pat. No. 4,039,030 issued to Godfrey et al. which is hereby incorporated by reference.

After placing the propellant means for creating multiple fractures into a housing means and suspending it downhole near the oil or hydrocarbonaceous fluid productive interval, it is ignited. Ignition of the propellant means for creating multiple radial fractures causes the generation of heat and gas pressure. To contain the generated propellant energy within the wellbore and formation, an aggregate stem, generally composed of cement, is placed above the housing means containing the propellant thereby sealing the wellbore. The suspended housing means and ignition means passes through the aggregate stem.

After ignition of the propellant means it is difficult to remove the aggregate stem, which often has to be drilled out. When removing the aggregate stem, the suspension means, generally a cable, and the ignition means, along with remnants of the housing means which previously contained the propellant, frequently fall into the wellbore. This debris may interfere with production of hydrocarbonaceous fluids from the formation. Drilling out the aggregate often damages the wellbore and formation.

Therefore, what is needed is a method to reduce the forces on downhole equipment used during a CPF operation so as to avoid damaging said equipment and formation.

SUMMARY OF THE INVENTION

This invention is directed to a method for reducing drag forces on a housing means containing a propellant which is suspended from a wireline along with an igniting means during a controlled pulse fracturing operation. In the practice of this invention, a housing means containing a propellant is suspended into a viscous gelled petroleum fluid within a wellbore near a formation's productive interval which interval is water-sensitive. The height of the fluid is sufficient to contain energy released from said propellant. The petroleum fluid contains an additive in an amount sufficient to cause it to gel prior to ignition of the propellant. The additive placed in the petroleum fluid comprises aluminum salts of surfactants and an organic cross-linker in an amount sufficient to gel said fluid. Once gelled, the viscosity of the fluid increases in an amount sufficient to increase the fluid's drag so as to minimize movement of the housing means and the wireline.

After suspending the housing means into the fluid, the propellant is ignited thereby causing the generation of energy and pressure sufficient to initiate more than two simultaneous radial fractures which are extended. The normal tendency for sudden movement of the tool following propellant ignition is suppressed by the drag forces imparted by the viscous hydrocarbon gel in contact with the wireline. Thus, the upward movement of the wireline is restricted, thereby minimizing tool movement and lessening tool damage. After ignition, and when conditions in the wellbore and formation have reached the desired level of stability, said fluid can be removed.

It is therefore an object of this invention to minimize equipment damage following a CPF treatment through use of a high drag fluid tamp which reduces movement of the CPF tool and wireline.

It is another object of this invention to use a viscous fluid to slow or stop upward movement of a propellant housing means so as to minimize downhole equipment damage.

It is still another object of this invention to provide a fluid tamp with increased viscosity to reduce downhole equipment damage.

It is a still yet further object of this invention to provide for a high drag fluid in the form of an oil based medium.

It is an even still yet further object of this invention to provide for an oil-based tamp fluid so as to avoid damage to a water sensitive reservoir or formation.

DESCRIPTION OF THE PREFERRED EMBODIMENTS

Figure 1:
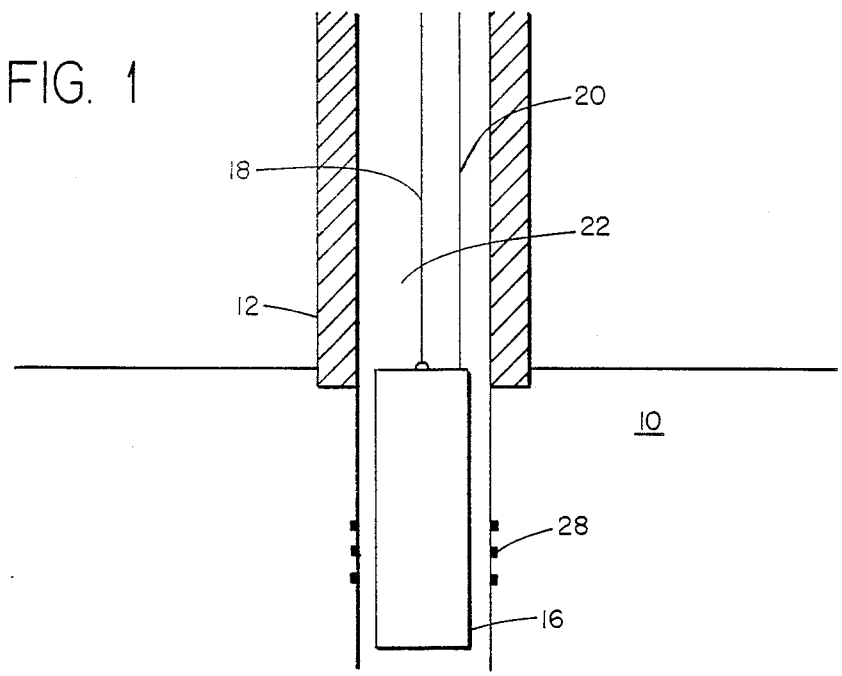
FIG. 1 is a graphic representation of a tamp fluid and housing means containing the propellant before ignition.

In the practice of this invention, referring to FIG. 1, a housing means 16 or molded tool body containing a propellant is placed into wellbore 12 which penetrates a petroleum or hydrocarbonaceous fluid producing formation 10 near the formation's productive interval. Wellbore 12 contains perforations 28 which communicate with the formation's productive interval. Housing means 16 is suspended into wellbore 12 in close proximity to the productive interval via a retrieval means, which generally will be a cable 18. A fluid 22 is directed into wellbore 12 thereby immersing housing means 16 for some vertical distance above housing means 16. Fluid 22 in wellbore 12 is of a height sufficient to balance the pressure in formation 10. Generally, this height will be at least about 500 feet above the housing means 16. Wellbore 12 is thereby filled with fluid 22 above the housing means. When filled in this manner, fluid 22 serves as a tamp for the propellant contained in housing means or canister 16.

In order to ignite the propellant contained in the housing means or canister 16, a means for igniting the propellant is connected to housing means 16. The other end of the means for ignition is connected or affixed to a location at or above ground level above wellbore 12. Said means for ignition will generally be a conduit 20 containing an electrical wire which wire can be used to generate an electrical spark within canister 16 containing the propellant. Both retrieval means, 18 and ignition means 20 proceed to the surface and through the cap (not shown) on wellbore 12.

Upon ignition of the propellant, heat and gas are released within wellbore 12. The sudden movement of fluid 22 following ignition of the propellant tends to drive cable 18 and the remnant of housing means or canister 16 upwards by gas expansion. However, the characteristics of the fluid are such that the viscosities thus generated minimize wireline damage and movement of the housing means remnant. Because of the high viscosity, the fluid experiences high increased resistance to flow up the production string or tubing. The viscous gelled petroleum fluid slows or stops the upward movement of the wireline and housing means which minimizes damage to the wireline and housing means. Since substantially less movement is experienced by cable 18 and canister 16, damage to this equipment is lessened.

In one embodiment, diesel fuel is used as a base for the fluid. Into the diesel fuel is placed a surfactant containing an aluminum salt. Preferred surfactants comprise aluminum dilaurate and aluminum stearate. A lauryl amine such as lauryldiamethylamine can be utilized when combined with an aluminum salt. The surfactant is placed into the diesel fuel in an amount sufficient to form a gel in the presence of an organic cross-linker. The surfactant is added into the diesel fuel in an amount of about 10 to about 100 gm/l, preferably about 40 gm/l.

Meta-cresol is the organic cross-linker preferred for use herein. Other organic cross-linkers which can be utilized include resorcinol and phenol. Depending on the cross-linker selected, the amount of cross-linker which is used can vary from about 5 to about 30 ml/l. However, when meta-cresol is used 15 ml/l is preferred. Once the surfactant and organic cross-linker have been added to the diesel fuel, the mixture is allowed sufficient time to form a gelled fluid. The gelled fluid is then injected into wellbore 12.

Although diesel fuel is preferred, other liquid hydrocarbons can be used. These include lease crude, naphthalene, and decanol.

U.S. Pat. Nos. 2,906,338, 2,978,024, 3,498,380, and 3,064,730 teach other methods to form hydrocarbon gels. These patents are hereby incorporated by reference herein. The concentration of surfactant and organic cross-linker utilized should be adjusted so as to obtain the optimum viscosity effect for flow conditions anticipated in a specific CPF application.

As will be understood by those skilled in the art, the concentration of surfactant and organic cross-linker will depend upon the composition of the compound utilized. Any concentration of surfactant and cross-linker used should have a viscosity sufficient to impart drag forces of sufficient magnitude along the fluid/solid interfaces in a well flow system where CPF downhole equipment is utilized so as to minimize upward movement of said equipment. Any increase in concentration of compound sufficient to impart an increase in vertical drag should be avoided.

While it is preferred to inject the hydrocarbon gel into the wellbore in its gelled state, the gelled hydrocarbon can be allowed to form in the wellbore, i.e., in situ.

Figure 2:
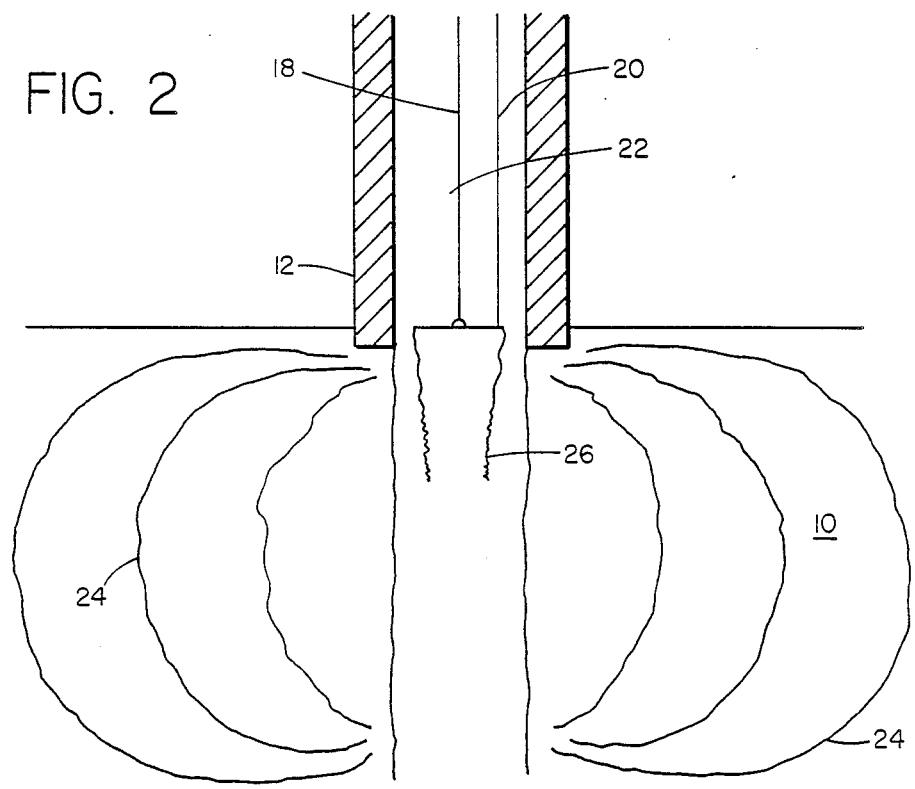
FIG. 2 is a graphic representation of a tamp fluid and housing means containing the propellant after ignition.

Once ignited, as is shown in FIG. 2, heat and pressure created by the propellant causes a total or partial disintegration of housing means or canister 26 which contained the propellant. However, as is shown in FIG. 2, cable 18 and ignition line 20 remain intact having sustained minimum damage. Once pressure on wellbore 12 has dissipated, retrieval cable 18, and ignition line 20, along with remnants of housing means or canister 26 are removed from the wellbore.

Fluid 22, after ignition, flows into wellbore 12 where it can be removed by any suitable physical means such as pumping to the surface. After any debris and viscous fluid have been removed from the wellbore, hydrocarbonaceous fluids can be produced from a formation when the created fractures intersect a natural hydrocarbonaceous fluid containing fracture.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for imparting high drag forces on a suspended propellant housing means and a propellant igniting means within a wellbore during controlled pulse fracturing comprising:
   (a) directing a gelled viscous petroleum fluid containing a surfactant and an organic cross-linker into a wellbore penetrating a water-sensitive formation which fluid is of a height sufficient to submerse said housing means and igniting means;
   (b) suspending said housing means with propellant therein and the igniting means into said wellbore and fluid near said formation's productive interval; and
   (c) igniting said propellant thereby generating energy and pressure sufficient to initiate simultaneous multiple radial fractures while forcing said fluid upwardly in said wellbore whereby the fluid's viscosity is sufficient to substantially enhance viscous drag thereby minimizing movement of a remnant of said housing means and the wireline so as to prevent damage thereto.

2. The method as recited in claim 1 where said gelled fluid comprises petroleum, an aluminum salt of a surfactant, and a meta-cresol organic cross-linker.

3. The method as recited in claim 1 where said gelled fluid comprises diesel fuel or lease crude oil, an aluminum salt of a surfactant, and a meta-cresol organic cross-linker.

4. The method as recited in claim 1 where said housing means is a canister.

5. A method for imparting high drag forces on a suspended propellant housing means and a propellant igniting means within a wellbore during controlled pulse fracturing comprising:
   (a) directing a gelled fluid into a wellbore penetrating a water-sensitive formation which fluid is of a height sufficient to submerse said housing means and igniting means which fluid comprises;
      (i) petroleum, diesel fuel, lease crude, napthalene, or decanol and mixtures thereof;
      (ii) an organic cross-linker; and
      (iii) a surfactant containing an aluminum salt;
   (b) suspending said housing means with a propellant therein and the igniting means into said wellbore and fluid near said formation's productive interval; and
   (c) igniting said propellant thereby generating energy and pressure sufficient to initiate simultaneous multiple radial fractures while forcing said fluid upwardly in said wellbore whereby the fluid's viscosity is sufficient to substantially enhance viscous drag thereby minimizing movement of a remnant of said housing means and the wireline so as to prevent damage thereto.

6. The method as recited in claim 5 where in step (a) (ii) said organic cross-linker comprises meta-cresol, resorcinol, or phenol.

7. The method as recited in claim 5 where in step (a) (iii) the surfactant comprises aluminum dilaurate or aluminum sterate.

8. The method as recited in claim 6 where in step (a) (iii) the surfactant additionally contains a lauryl amine.

9. The method as recited in claim 5 where said housing means is a canister.

10. The method as recited in claim 5 where in step (a) (iii) surfactant is added into the gelled fluid in an amount of from about 10 to about 100 grams per liter.

11. The method as recited in claim 5 where in step (a) (ii) said cross-linker is contained in said gelled fluid in the amount of from about 5 to about 30 milligrams per liter.

12. A method for imparting high drag forces on a suspended propellant housing means and a propellant igniting means with a wellbore during controlled pulse fracturing comprising:
   (a) making a fluid containing components in an amount sufficient to make a gelled fluid in-situ which can penetrate a water-sensitive formation where said fluid is of a height sufficient to submerse said housing means and igniting means which fluid comprises;
      (i) petroleum, diesel fuel, lease crude, napthalene, or decanol and mixtures thereof;
      (ii) an organic cross-linker; and
      (iii) a surfactant containing an aluminum salt;
   (b) directing the fluid into said wellbore and allowing it to form a gelled fluid in-situ;
   (c) suspending said housing means with a propellant therein and the igniting means into said wellbore and fluid near said formation's productive interval; and
   (d) igniting said propellant thereby generating energy and pressure sufficient to initiate simultaneous multiple radial fractures while forming said fluid upwardly in said wellbore whereby the fluid's viscosity is sufficient to substantially enhance viscous drag thereby minimizing movement of a remnant of said housing means and the wireline so as to prevent damage thereto.

13. The method as recited in claim 12 where in step (a) (ii) said organic cross-linker comprises meta-cresol, resorcinol, or phenol and mixtures thereof.

14. The method as recited in claim 12 where in step (a) (iii) the surfactant comprises aluminum dilaurate or aluminum sterate and mixtures thereof.

15. The method as recited in claim 12 where in step (a) (iii) the surfactant additionally contains a lauryl amine.

16. The method as recited in claim 12 where said housing means is a canister.

17. The method as recited in claim 12 where in step (a) (iii) surfactant is added into the gelled fluid in an amount of from about 10 to about 100 grams per liter.

* * * * *

UNITED STATES PATENT AND TRADEMARK OFFICE
CERTIFICATE OF CORRECTION

PATENT NO. : 4,982,790

DATED : January 8, 1991

INVENTOR(S) : Hunt et al.

It is certified that error appears in the above-identified patent and that said Letters Patent is hereby corrected as shown below:

Col. 5, line 47: "claim 6" should read --claim 5--

Col. 6, line 10, "with" should read --within--

Col. 6, line 30, "forming" should read --forcing--.

Signed and Sealed this

Thirtieth Day of June, 1992

Attest:

DOUGLAS B. COMER

Attesting Officer

Acting Commissioner of Patents and Trademarks